July 9, 1968

L. J. MALTBY 3,391,881

DOCKING MECHANISM

Filed June 5, 1964

LEWIS J. MALTBY
INVENTOR.

BY R. E. Geangue

ATTORNEY

July 9, 1968     L. J. MALTBY     3,391,881
DOCKING MECHANISM
Filed June 5, 1964     7 Sheets-Sheet 7

LEWIS J. MALTBY
INVENTOR.

BY R. E. Geauque

ATTORNEY

United States Patent Office 3,391,881
Patented July 9, 1968

---

3,391,881
DOCKING MECHANISM
Lewis J. Maltby, Burbank, Calif., assignor to Menasco Manufacturing Company, Burbank, Calif., a corporation of California
Filed June 5, 1964, Ser. No. 373,017
15 Claims. (Cl. 244—1)

This invention relates to a docking mechanism and more particularly to a docking mechanism for connecting together and separating vehicles in space.

Exploration of space and space travel can be facilitated by placing vehicles in orbit about the earth or other bodies in space. Exploratory vehicles can be serviced by orbiting vehicles and can also be commanded from orbiting vehicles. In order to accomplish these operations, a mechanical means for connecting and disconnecting an orbiting vehicle and an exploring vehicle must be utilized. Such a connecting means should provide for transfer of personnel between the vehicles while connected together.

The present invention provides a docking mechanism, particularly useful for space vehicles, which has minimum weight and maximum reliability. Provision is made for aligning the vehicles when connected together even if initial misalignment of the vehicles exists as they approach one another. Also, provision is made for shock absorption upon initial contact of the vehicles. When the vehicles are connected, a sealed tunnel can exist between vehicles through which personnel can travel from one vehicle to another. One vehicle carries a passive connecting structure to which the active structure of the other vehicle connects. The passive structure consists of a ring which is provided with suitable support structure to hold the ring at a distance from the vehicle. The active structure consists of a plurality of identical arm assemblies which are mounted on the other vehicle and radiate outward from the vehicle. As the vehicles approach, the ring engages the arm assemblies and pivots the arms against shock absorbers which thereafter return the arms to their initial position. The initial pivot motion of the arms releases hooks which are propelled along the arms and lock onto the ring and the arms are then returned by the shock absorbers to the initial outward position with the hooks attached to the ring. An actuator for each arm then pivots the arms inwardly toward the active vehicle in order to center, align and pull the vehicle together and lock them to one another. The arms are locked in the inward position until it is desired to release the vehicles, at which time the hooks are released and the shock absorbers then push the arms to the outward extended radial position, thus providing a force which pushes the vehicles apart and produces positive separation.

It is therefore an object of the present invention to provide a docking mechanism for connecting and disconnecting two vehicles.

Another object of the invention is to provide a docking mechanism for connecting and disconnecting vehicles, one vehicle carrying a passive ring device which engages active arm mechanisms on the other vehicle.

Another object of the invention is to provide a space docking mechanism for connecting and disconnecting two vehicles in space, said mechanism providing shock absorption upon initial contact and providing forced alignment of the vehicles prior to locking the vehicles together.

Another object of the invention is to provide a space docking mechanism for connecting and disconnecting two vehicles in space, said mechanism providing immediate attachment of the vehicles upon initial contact.

A further object of the invention is to provide a space docking mechanism for connecting and disconnecting two vehicles in space, said mechanism having positive locking means which can be quickly released for freeing the vehicles and having means to produce a positive separation force upon release of the locking means.

These and other objects of the invention not specifically set forth above will become readily apparent from the accompanying description and drawings in which:

FIGURE 14 is an end elevational view of the arm mechanism taken along line 14—14 of FIGURE 12.

FIGURE 15 is a section along line 15—15 of FIGURE 12 illustrating the sections of the air spring;

FIGURE 16 is a section along line 16—16 of FIGURE 12 showing the carriage plate to which the air springs are attached;

FIGURE 17 is a partial sectional view along line

17—17 of FIGURE 9 showing the hook attached to the hook carriage with both in inboard retracted position;

General operation

The embodiment of the docking mechanism chosen for the purpose of illustration, connects and disconnects vehicles 20 and 21. Vehicle 20 carries the passive structure and the vehicle 21 carries the active structure. The passive structure comprises a ring 23 which is supported at a convenient distance from the vehicle 20 by means of four pairs of structural support members 24 with each pair connecting with the ring at a single point 25. The opposite ends of the members 24 connect to end 27 of the vehicle 20. The active structure carried by the vehicle 21 consists of four identical arm assemblies 28 which are pivoted at the nose of cone section 29 and normally radiate outward from the longitudinal axis of the vehicle 21. When the two vehicles become attached, the arm mechanisms 28 are located within the slots 30 in the cone section 29 as will be presently described.

Figure 2:
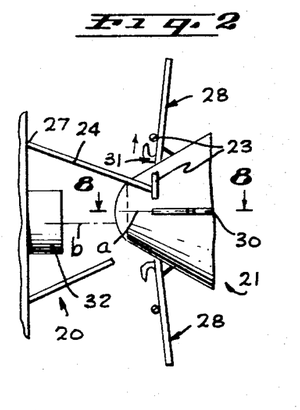
FIGURE 2 is an elevational view of the two vehicles in somewhat misaligned relationship and showing the initial contact between the ring on one vehicle and the arm mechanisms on the other vehicle.
Figure 3:
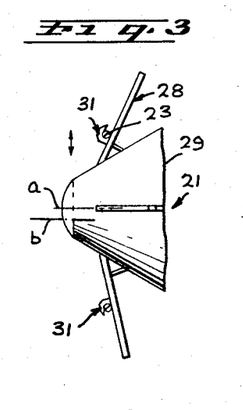
FIGURE 3 is an elevational view showing the hooks locked onto the ring and the arms pivoted against the shock absorbers.

When the vehicles are to be connected or docked to one another, they are manuevered so that the nose of cone 29 enters the ring 23 and the initial contact of the ring with the four arm assemblies is illustrated in FIGURE 2. The impact of the ring on the arms cause the arm assemblies 28 to initially move rearwardly about their pivot against the action of a shock absorber and this original rearward movement releases a hook 31 carried by each arm assembly so that the hook can move outwardly and engage the ring 23. In FIGURE 3, the hooks are in engagement with the ring and the arm assemblies are shown pivoted somewhat rearwardly. The hooks contain a latch assembly which traps the ring and prevents the hook from rebounding away or otherwise losing contact with the ring.

Figure 4:
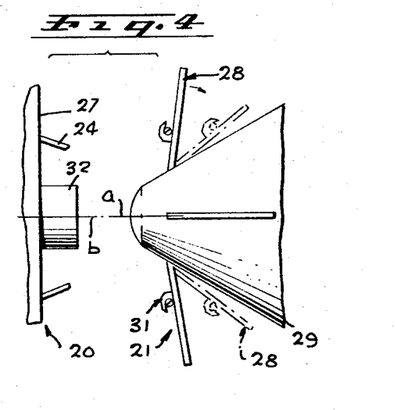
FIGURE 4 is an elevational view of the arm mechanisms moved back to initial position by the shock absorbers and with the vehicles moved into approximate alignment by the hooks.
Figure 5:
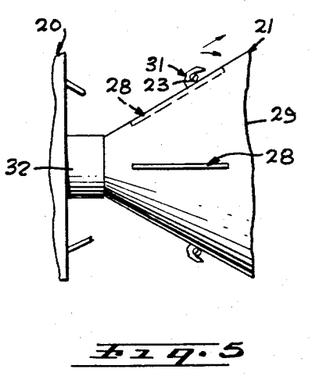
FIGURE 5 is an elevational view of the arm mechanisms fully retracted to precisely align and lock the two vehicles together.

In both FIGURES 2 and 3, the longitudinal axis $a$ of vehicle 21 is shown offset from the longitudinal axis $b$ of vehicle 20 since only in an exceptional case would the two vehicles be brought together with their axes in exact alignment. Since the hooks 31 are moved outwardly by air springs upon slight pivot of the arms, the hooks exert a centering force upon the ring 23 which serves to approximately align the axes of the vehicles as the arm assemblies are returned to their upright position by the shock absorbers (see FIGURE 4). In other words, when the impact energy has been dissipated and the relative velocity of the vehicles is reduced to zero, shock absorber springs force the arms to swing out and forward again. If there is a cocking between the two vehicles, the hook spring forces will be unbalanced and will tend to approximately center and align the vehicles. After the hooks 31 are locked onto the ring 23 and the impact absorbed, actuators move the individual arm assemblies in the direction of the arrow of FIGURE 4 and, as illustrated by the dotted line position, the arms are folded into the slots 30 on the cone surface 29. In FIGURE 5, the arm mechanisms 28 are shown fully retracted with the hooks fully extended to hold the ring 23 tightly against the cone surface 29 of vehicle 21. By locking the arm assemblies in this position, the vehicles are precisely aligned and held firmly together with the nose of the cone section 29 inserted into an entry tunnel 32 on the end 27 of vehicle 20. Since the surfaces are in sealing relationship, personnel can be transferred from one vehicle to the other through the tunnels 32 and 35 after the nose hatch 36 is removed.

Figure 1:
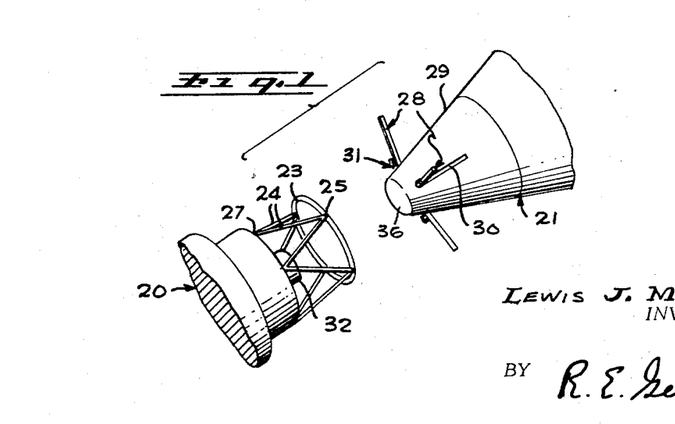
FIGURE 1 is a perspective view of two vehicles equipped with the present invention and approaching one another for attachment together.
Figure 6:
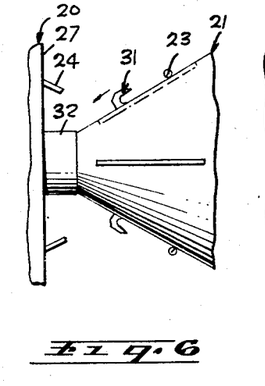
FIGURE 6 is an elevational view showing the initial release of the hooks from the ring to permit separation of the two vehicles.
Figure 7:
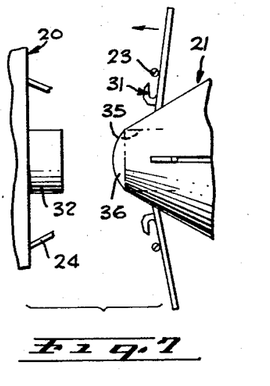
FIGURE 7 is an elevational view showing the arm mechanisms returned to extended position to positively move the two vehicles apart.

When it is desired to release the vehicles, the arm assemblies are unlocked and an air spring carried by each of the arm assemblies quickly pushes the hook 31 and hook carriage to the inboard end of the arm as illustrated in FIGURE 6 and this action quickly withdraws the hooks so that the vehicles are disconnected instantaneously. At the same time, the arm assemblies are also released so that the shock asborber for each arm can push the arms to the extended position as illustrated in FIGURE 7, thus providing a force which pushes the vehicles apart and produces positive separation. When the arms reach the fully extended position, a trigger mounted in the nose cone structure engages the hooks and the arm assemblies are again in the condition of FIGURE 1 and ready to repeat the docking cycle.

Mechanism structure

Figures 8, 20:
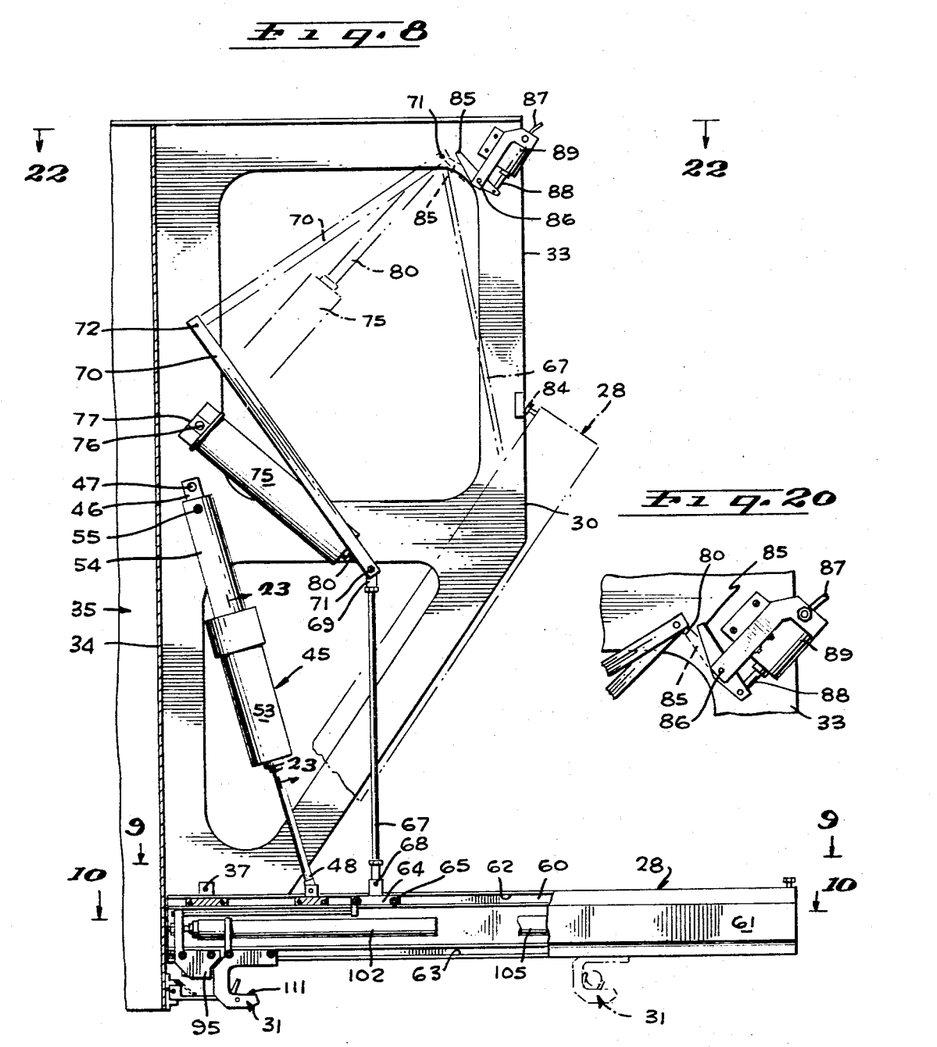
FIGURE 8 is a sectional view along line 8—8 of FIGURE 2 showing one of the arm mechanisms and the mounting structure therefor.
FIGURE 20 is an enlarged elevational view of the latch mechanism for holding the actuator linkage in position to lock the vehicles together.
Figure 22:
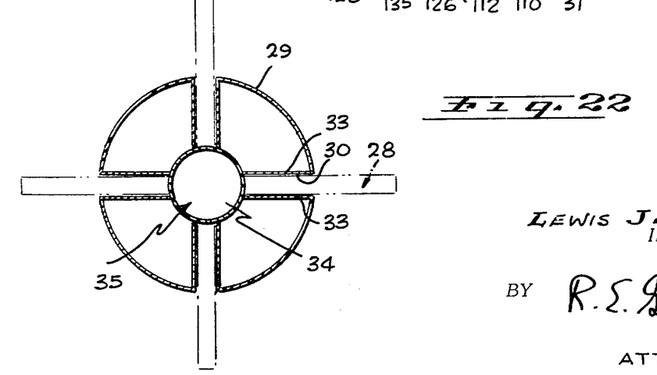
FIGURE 22 is a sectional view along line 22—22 of FIGURE 8 showing the channels in the nose structure within which the separate arm mechanisms are mounted.
Figure 23:
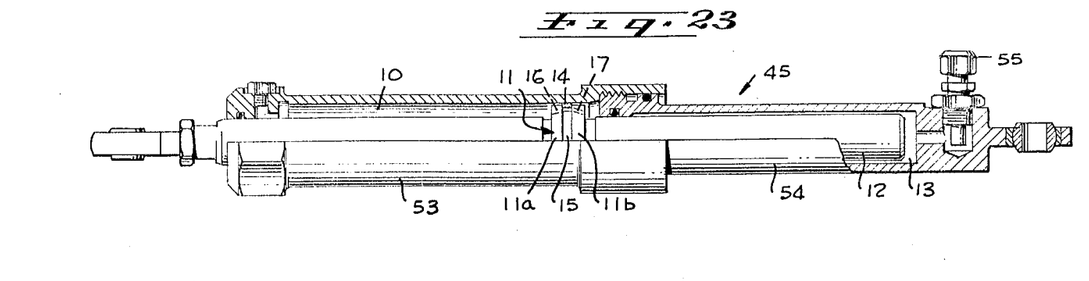
FIGURE 23 is a section along line 23—23 of FIGURE 8 showing the shock absorber attached to each arm mechanism.

Referring to FIGURE 22, the cone section 29 is shown containing four slots 30 for the four arm assemblies 28, each slot being defined by a pair of frame members 33 radiating outwardly from the wall 34 of a central cylindrical tunnel 35. A pivot pin 37 for each arm assembly extends between two frame members 33 and through an offset lug 38 which is attached to arm assembly 28 by means of bolts 39 passing through a mounting plate 40. Referring to FIGURE 8, the arm assembly 28 is shown in its outward, radial position in which it is held by a shock absorber 45. The shock absorber 45 has one end 46 pivotally connected to a pin 47 which extends between the two frame members 33 and spacers serve to center the end 46. The opposite end 48 of the shock absorber 45 is pivoted to a pin 49 passing through offset lugs 50 carried by a mounting plate 51 which is rigidly secured to the arm assembly 28 by bolts 52. Referring to FIGURE 23, shock absorber 45 is of the type in which the front portion 53 comprises an oil chamber 10 through which a piston 11 moves unrestricted in the rearward direction and restricted in the forward direction and in which the rear portion 54 contains the end of a plunger 12 operating against a compressed gas in space 13 to provide a spring effect to absorb the impact energy and to return the shock absorber to its original, extended position. Thus, the shock absorber 45 is an energy dissipator which utilizes oil for damping and high pressure gas to absorb energy and obtain a return force. The oil restriction is provided by a piston ring 14 which is axially movable in groove 15. When the piston 11 moves rearwardly, oil flows through slots 16 in land 11a and under piston ring 14 and past land 11b. When the piston 11 moves forwardly, the piston ring is against land 11b and the oil must pass through the single orifice passage 17 in land 11b which provides the restriction. The rear portion 54 of the actuator has a gas charging fitting 55 to regulate the gas pressure behind the plunger.

Figures 14, 15, 16, 17:
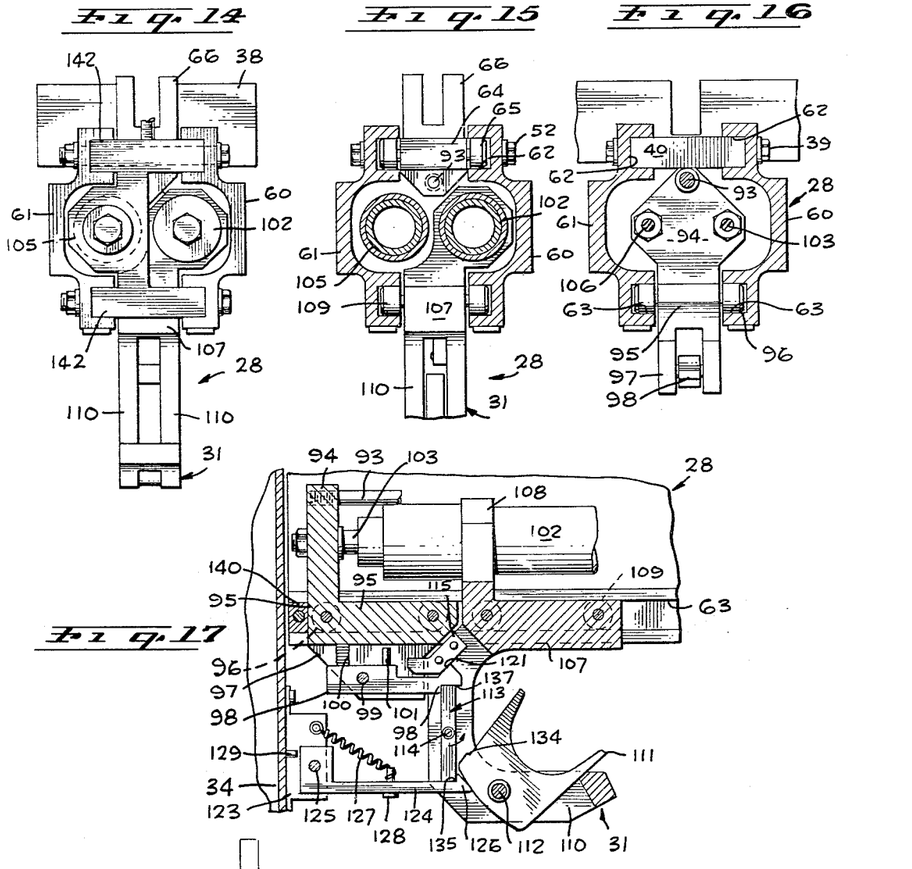
Figure 21:
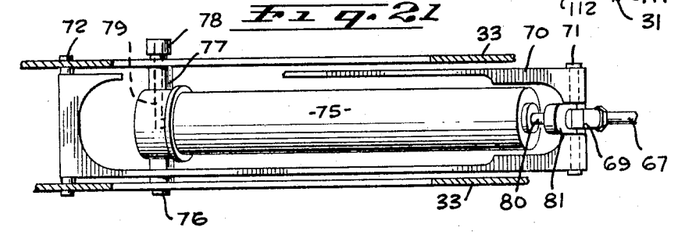
FIGURE 21 is a plan view of the actuator for moving the actuator linkage.

As illustrated in FIGURE 16, the arm assembly 28 comprises side members 60 and 61, each of which contains an upper groove 62 and a lower groove 63. The mounting plates 40 and 51 have their ends secured in the upper grooves 62 by the bolts 39 and 52, respectively. A carriage block 64 is equipped with rollers 65 which ride in the opposed grooves or tracks 62 in the sides 60 and 61. The carriage 64 has spaced projections 66 between which the end of an actuator link 67 is pivotally mounted by a pin 68. The other end 69 of the actuator link 67 is connected to the link 70 by means of pin 71 and the opposite end of the link 70 is pivotally mounted to a pin 72 extending between frame sections 33. As illustrated in FIGURE 21, the link 70 is cut away to receive one end of an actuator 75 which has its other end pivotally mounted to frame members 33 by means of pin 76 which passes through an enlargement 77 on the end of the actuator. End 78 of the bolt 76 is enlarged to receive an air fitting which connects with the actuator through passage 79 in the bolt. Plunger 80 of the actuator has a forked end 81 which is pivotally connected to the pin 71 on each side of end 69 of link 67 so that link 67, link 70, and actuator 75 have a common pivot pin 71.

When compressed gas is admitted to the passage 79, plunger 80 extends thereby moving the actuator 75 and the links 67 and 70 into the dotted lined positions shown in FIGURE 8. As the links reach the end of their travel, the end of the plunger 80 moves against a latch arm 85 which is spring biased into the doted line position of FIGURE 8. The plunger 80 pivots arm 85 about a pin 86 which passes through spaced arms on opposite sides of the latch arm and after the plunger end passes by the end of the latch arm, the spring bias returns the latch arm to its original position in which the end of the latch arm is underneath the end of the plunger 80, thereby locking the linkage. During the extension of the plunger 80, the link 67 pulls the carriage 64 along the tracks 62 until the carriage reaches the end of the arm assembly 28, at which time the arm assembly has been pulled into a slot 30 in the cone section 29 and a stop lug 84 has neared a frame member 33 for limiting the inward movement of the arm assembly. With the carriage block 64 at the end of the arm assembly and with the actuator linkage in the dotted line position of FIGURE 8, the docking mechanism corresponds to FIGURE 5 wherein the vehicles are firmly secured together. When it is desired to release each arm mechanism, compressed gas is admitted to a cylinder 89 containing a plunger 88 which is connected to latch arm 85 and the plunger moves the arm into the full line position of FIGURE 8 in order to free the actuator linkage from the latch arm 85 so that the shock absorber 45 can return the arm assembly 28 to the fully outward, radial position. At the same time, carriage 64 is quickly moved to the inboard position by an air spring as will be presently described. An enlarged view of the latch arm 85 in locking position is shown in FIGURE 20.

Figure 9:
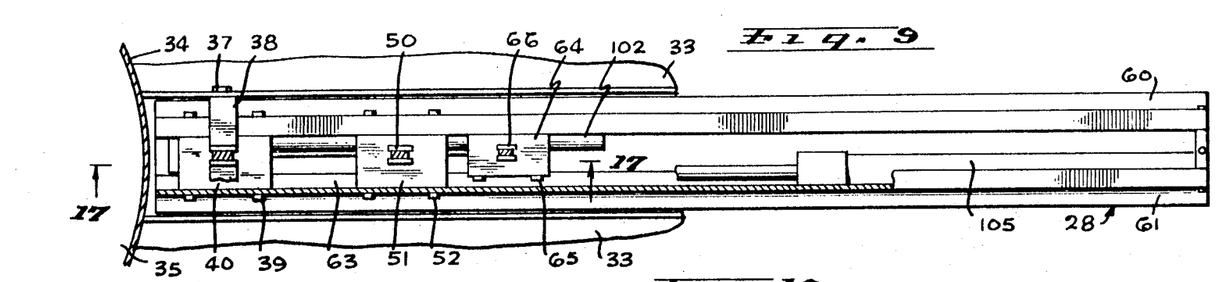
FIGURE 9 is an elevational view, partly in section, along line 9—9 of FIGURE 8 showing the air spring for propelling the hook outwardly and the air spring for returning the hook and its carriage to inboard position.

The carriage block 64 is connected by a tension rod 93 to head plate 94 which is located between the sides 60 and 61 of the arm assembly 28 at the inboard end thereof. The plate 94 is integral with a hook carriage 95 which is supported by rollers 96 located in the groove 63 (see FIGURE 17). A pair of spaced projections 97 extend from the carriage 95 and mount a latch 98 on a shaft 99 which extends between the projections. A coil spring 100 normally biases the latch 98 about the shaft 99 so that the latch end is biased toward the carriage 95 and stop 101 limits the latch movement. An air spring 102 has its plunger end 103 connected to mounting plate 94 and the spring is normally in the compressed condition as illustrated in FIGURES 8, 9, and 17. A second air spring 105 is located side by side with air spring 102 and has its plunger 106 also connected to the head plate 94. As illustrated in FIGURES 8 and 9, the air spring 105 is normally in extended, non-compressed condition.

Figure 18:
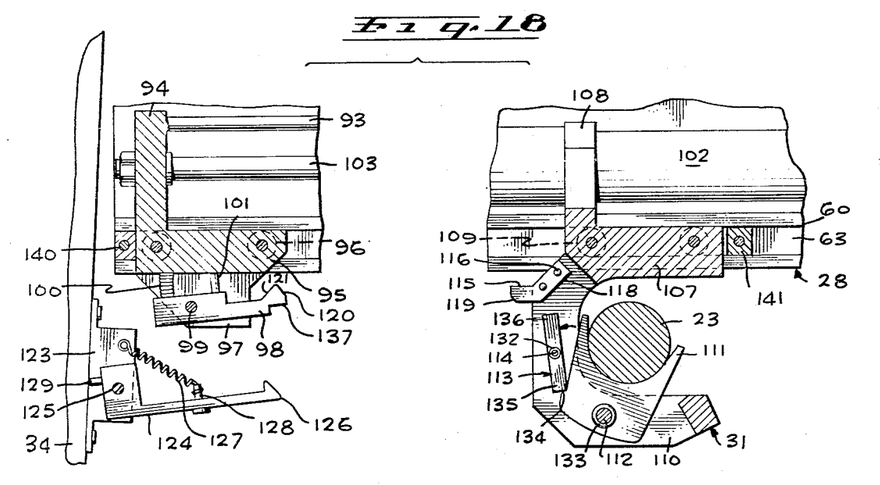
FIGURE 18 is a sectional view similar to FIGURE 17 showing the hook and hook carriage after release of the hook caused by initial pivot movement of the arm upon contact with the ring.

Referring to FIGURE 18, the cylinder of air spring 102 is connected to a hook base 107 by means of a collar 108 and the base 107 has rollers 109 located in tracks 63 for movement of the base 107 along the arm assembly 28. The base 107 supports the hook 31 which is in the form of two spaced arms 110 between which is rotatably mounted a ring latch 111 by pin 112 and a locking arm 113 by pin 114. Also, a fixed ramp 115 is secured between the arms by means of pins 116. The member 115 has ramp surfaces 118 and 119 which coact with surfaces 120 and 121, respectively, of the latch 98. Inboard ends of the arm assemblies are each located adjacent the wall 34 of tunnel 35 and the wall 34 carries a bracket 123 to which is pivotally supported one end of a latch arm 124 by means of a pivot 125. The latch arm has a hook end 126 and is continually biased towards the arm assembly 28 by spring 127 which is connected between bracket 123 and a pin 128 on the latch arm. A stop 129 carried by arm 124 limits the amount of movement of the arm by the spring.

Figure 19:
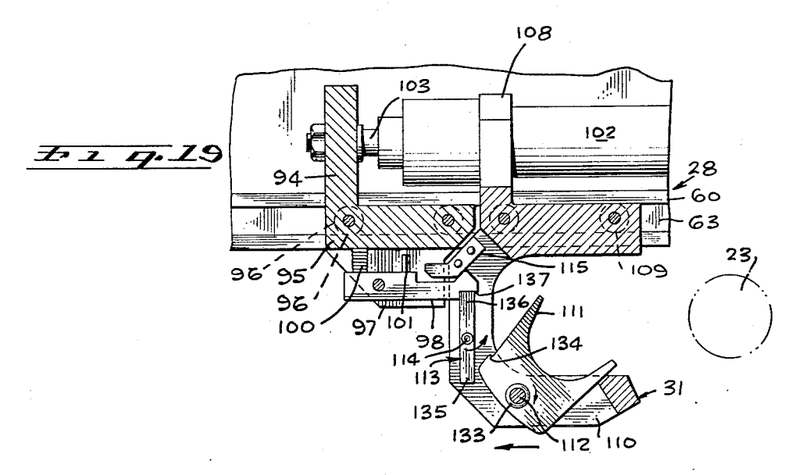
FIGURE 19 is a sectional view similar to FIGURE 17 showing the hook and hook carriage after release from the ring in order to permit separation of the vehicles.

Lock arm 113 has a torsion spring 132 located about pin 114 to continually urge the arm in a counterclockwise direction towards the ring latch 111 which serves as a stop for the arm. Also, pin 112 for lock 111 is surrounded by torsion spring 133 which continually biases latch 111 in a clockwise direction. Ledge 134 of latch 111 coacts with end 135 of locking arm 113 to prevent latch 111 from rotating clockwise, thus locking the hook to ring 23 as illustrated in FIGURE 18. As illustrated in FIGURE 19, when the hook carriage 95 is moved outward against the hook base 107, the cam surface 120 of latch 98 engages the cam surface 119 of member 115 and raises the latch 98 so that it can slide over the member 115 and engage the cam surface 121 against the cam surface 118 of member 115. At the same time, the end of latch 98 rotates lock arm 113 clockwise against spring 132 to cause one end 135 of the lock arm to move away from ledge 134 of latch 111 and allow spring 133 to rotate latch 111 clockwise when hook 31 is withdrawn from ring 23. After the cam surface 121 engages against surface 118, the other end 136 of lock arm 113 rotates counter-clockwise over the end surface 137 of latch arm 98 to lock the carriage 95 to the hook base 107. Referring now to FIGURE 17, when the carriage 95 and hook base 107 are moved to the inboard end of arm assembly 28 by the force of air spring 105, the hook end 126 of latch arm 124 slides up and over end 135 of latch arm 113. Stop members 140 and 141 extend between grooves 63 in sides 60 and 61. Stop 140 limits the inboard movement of carriage 95 and stop 141 limits the outboard movement of hook base 107. End piece 142 serves to connect the outboard ends of sides 60 and 61 and provides a recessed support for the cylinder end of air spring 105.

*Operation*

Figure 10:
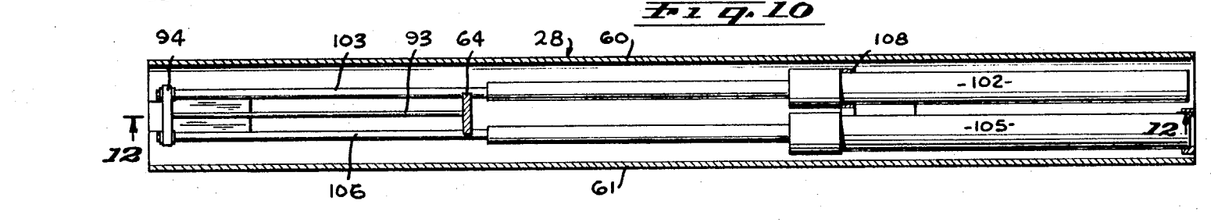
FIGURE 10 is a sectional view along line 10—10 of FIGURE 8 showing the hook propelling air spring extended to move the hook into initial engagement with the ring.
Figures 12, 13:
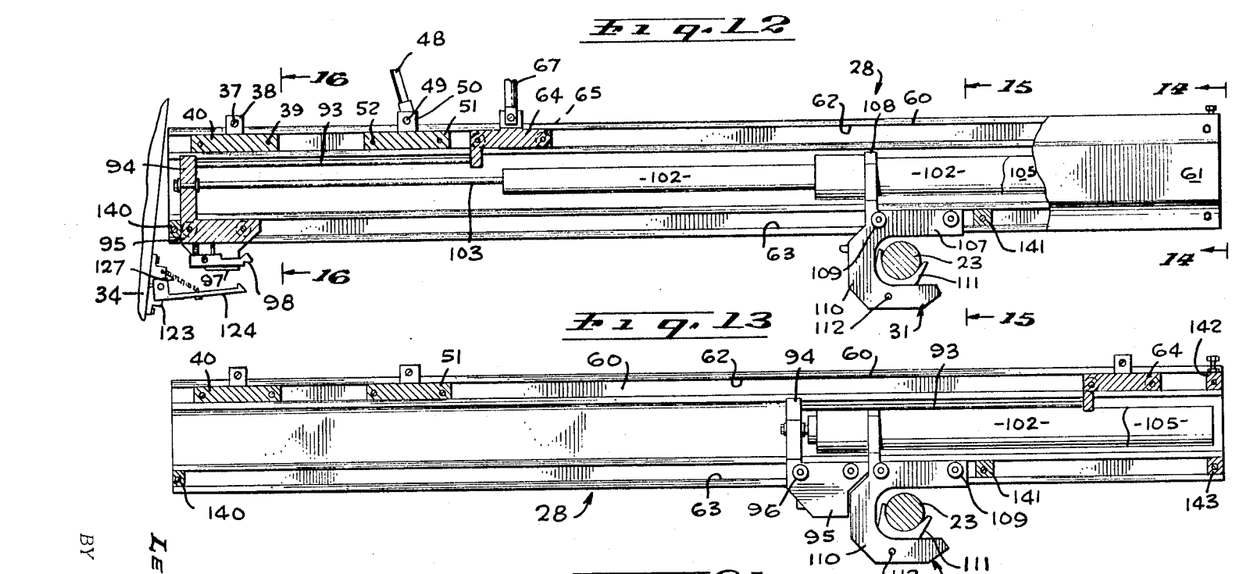
FIGURE 12 is a section along line 12—12 of FIGURE 10 showing the hook propelling air spring in extended position.
FIGURE 13 is a section along line 13—13 of FIGURE 11 showing the hook propelling spring compressed by the hook carriage.

As the ring 23 engages the arm assemblies 28, each arm pivots slightly about pin 37 as illustrated in FIGURES 12 and 18. This movement causes the latch 124 to rotate the lock arm 113, thereby freeing the latch 98 to ride over the member 115. The base 107 is then separated from the carriage 95 by the force of air spring 102 and the spring drives the base 107 rapidly along the track 63 until the hook latch 111 moves into engagement with the ring 23 (see FIGURE 18). The engagement force will rotate the latch 111 and end 135 of lock arm 113, which is biased in a counterclockwise direction, moves under the ledge 134 of the latch 111, thus locking the hook 31 to the ring 23 as shown in FIGURE 18 which corresponds to the configuration of FIGURE 3. As illustrated in FIGURES 10 and 12, the hook base 107 can be propelled by spring 102 out to the stop 141 if this amount of movement is necessary for the hook 31 to engage the ring. However, other hooks on the other arm assemblies can move shorter distances before engaging the ring. Thereafter, the shock absorber 45 will move each arm into a more outwardly position after the impact has been absorbed, and at the same time, the force of spring 102 on each of the hooks 31 will bring the two vehicles into approximate alignment as illustrated in FIGURE 4.

Figure 11:
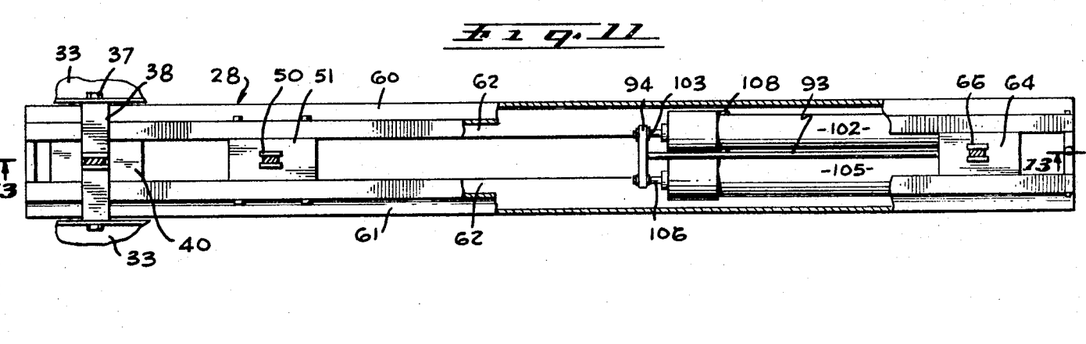
FIGURE 11 is a sectional view similar to FIGURE 10 showing the condition of the two air springs when the vehicles are locked together, the hook propelling spring and the hook returning spring being compressed.

After the arms have been returned to their upright position by the shock absorber 45, actuator 75 is energized by the operator of vehicle 21 to move the arms 28 inwardly into the slots 30 and firmly lock the two vehicles together. Movement of actuator plunger 80 causes the link 67 to pull carriage 64 outwardly along the arm and this action pulls the arm in flush with the nose of the vehicle as shown in FIGURES 11 and 13 which corresponds to the configuration of FIGURE 5. The carriage 95 in its movement along the arm contacts the hook base 107 and latches to it, at the same time unlocking the latch 111 from ring 23. Thereafter, the carriage 95 driven by actuator 75, pushes the hook 31 along the arm 28 forcing the ring to move with the hook into the precisely aligned and locked position. When the carriage 95 engages the hook base 107, the latch 98 rotates the lock arm 113 against spring 132 so that the end of latch arm 98 will again overlap the member 115 and the end 136 of lock arm 113 will thereafter move back over surface 137 of latch 98 to thereby lock carriage 95 to base 107 while opening latch 111 by end 135 moving away from ledge 134.

After the actuator linkage has been fully extended by the actuator 75, both springs 102 and 105 will be in the compressed condition as shown in FIGURES 11 and 13. Since the carriage 95 and base 107 are locked together when the carriage 95 is pulled into engagement with the base 107, spring 102 will be locked in compressed condition and spring 105, as well as shock absorber 45, will be compressed upon outward movement of carriage 95. At the end of the actuator stroke, the linkage moves past latch 85 which moves under the end of plunger 80 to prevent movement of the linkage and of hook 31 connected to the linkage through tension rod 93 and plate 94. With the actuator linkage in the locked position shown by dotted lines in FIGURE 8, the arm assemblies 28 are held in the slots 30 in the conical surface as illustrated in FIGURE 5 and the vehicles are firmly locked together with the nose of the cone section 29 within the tunnel 35 to permit movement of personnel between vehicles. Also, the fluid is exhausted from the actuators 75 by the operator.

When it is desired to release the vehicles, compressed gas is applied through line 87 to cylinder 89 to move the latch arm 85 out from under the actuator linkage, thereby freeing the carriage 95 and base 107 for rapid movement by air spring 105 toward the inboard end of the arm assembly. This action quickly separates the hooks 31 from the ring 23 since the latches 111 have been previously unlocked as illustrated in FIGURE 19 which corresponds to the configuration of FIGURE 6. Thereafter, the shock absorbers 45 will push the arms back to the extended position, as illustrated in FIGURE 7, with a positive force which produces positive separation of the vehicles.

When the arms return to their fully extended position as shown in FIGURE 8, the latch arm 124 rides over and locks upon the end 135 of lock arm 113 so that the arm assembly is again ready to repeat the docking cycle. During the return of the carriage 95 and hook base 107 to the inboard position by the air spring 105, the lock arm 113 locks these members together since end 136 of lock arm 113 remains over the surface 137 of latch arm 98.

Figure 24:
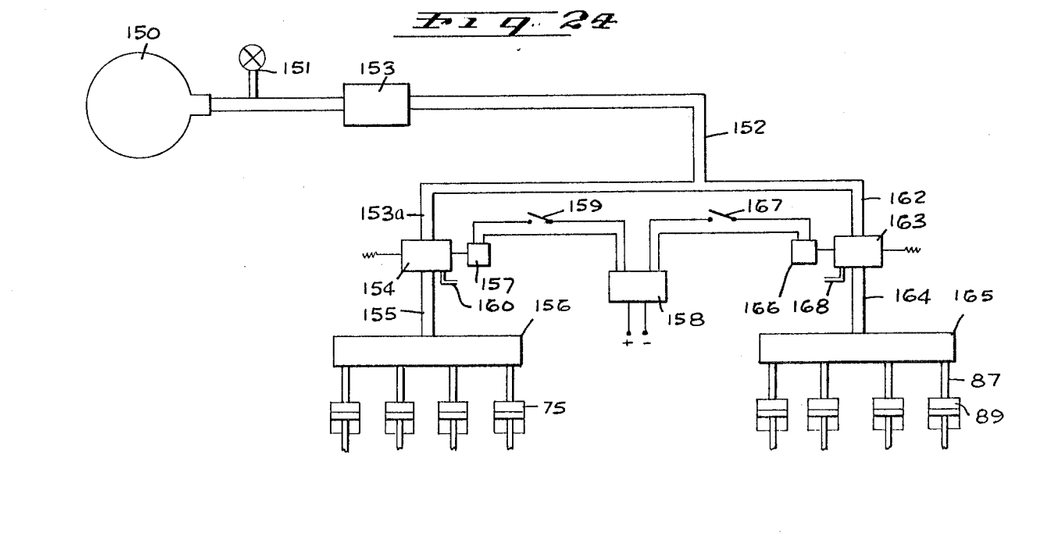
FIGURE 24 is a schematic diagram of the control system for the arm mechanisms.

In FIGURE 24, the operating system is illustrated which consists of a high pressure vessel 150 which can be charged with high pressure nitrogen gas through passage 151. The vessel connects with supply line 152 through a pressure regulator 153 which reduces the supply pressure to a constant value. The supply line 152 has a branch 153a leading to a three-way, normally closed valve 154 which is connected by a line 155 to manifold 156 for the individual link actuator 75. The three-way valve is opened by a solenoid 157 connected to a power source 158 through a normally open switch 159. When the switch 159 is closed, the solenoid 157 connects the line 153 to the line 155 in order to cause the actuators 75 to pivot the arm assemblies 28 to their inward position. After the actuator linkages are locked by latches 85, the actuators 75 will be exhausted through the line 160 by opening switch 159. In a similar manner, the supply line 152 has a branch 162 connecting with a three-way, normally closed valve 163. Line 164 connects valve 163 to manifold 165 which supplies the individual locking cylinders 89 through the lines 87. The valve 163 is controlled by a solenoid 166 which is connected through switch 167 with the electrical source 158. When the switch 167 is closed by the operator, the line 162 is connected with the line 164 in order to move latches 85 and unlock the actuator linkage thereby permitting the shock absorbers to return the arm assemblies to their initial position ready for another docking operation. Once the arm assemblies have started to move towards their outward, radial position, the operator will open switch 167 to connect the manifold 165 to exhaust passage 168. Thus, the complete operation of the system is controlled by personnel inside the active vehicle 21. In summary, after hooks 31 have locked onto the ring 23, the operator closes switch 159 to move the arms into the centering and locking position and after the arms are locked, the switch is opened. When it is desired to disconnect the vehicles, it is only necessary to close the switch 167 for a long enough period to permit the actuator linkages to clear the stops 85. The arm assemblies will then automatically return to their initial position ready for another docking operation.

The invention provides a docking mechanism which incorporates shock absorption followed by mechanical attachment immediately after initial contact and then self alignment. Also, positive locking, quick release and positive separation are provided with a minimum of attention by the operator. A long shock absorbing stroke can be provided between the vehicles even though the shock absorber itself has a short stroke. Therefore, the mechanism is tolerant of widely varying vehicle masses and impact velocities. Also, a large misalignment tolerance can be accommodated since the allowable misalignment depends only on the diameter chosen for the ring structure and on the length of the arms. Final alignment of the vehicles is controlled on a large diameter so that manufacturing and assembly tolerances are not critical and since the locks are located on a large diameter, the magnitude of the lock loads is reduced. The docking and release of the vehicles does not require the use of the vehicles' attitude control jets at any time which conserves the fuel supply for the jets. If necessary, the active mechanism can be retracted flush with the vehicle during either launch or re-entry.

While the active mechanism is shown on the end of a cone section, it is understood that it could be located on a large surface of a vehicle and a small ring could extend from a large surface of the other vehicle. Also, a large circular ring could surround one vehicle and a large number of arm assemblies could extend from the outer edge of the other vehicle. In other words, in the utilization of the docking mechanism, the number of arm assemblies and the shapes and sizes of the vehicles can be varied without changing the overall engaged action of the arms with the ring. It is understood that the docking mechanism is constructed of materials which are suitable for space operation when the mechanism is to be utilized for docking space vehicles and any suitable power source, in addition to high pressure gas, can be utilized and different types of actuators, shock absorbers, and springs can be utilized. While the passive structure is shown as a ring, it can take the form of any elongated member having various shapes, such as square, and the arm assemblies of the active structure can engage suitable portions of the elongated member. Also, it is understood that the docking mechanism can be used to attach any two objects together and that only one of the objects has to be movable. Various other modifications are contemplated by those skilled in the art without departing from the spirit and scope of the invention as hereinafter defined by the appended claims.

What is claimed is:

1. A docking mechanism for connecting and disconnecting objects comprising:

a passive structure including an elongated member supported at a distance from one object;

an active structure carried by the other object;

said active structure comprising means operative upon movement by said elongated member for engaging said elongated member and holding said objects together;

means for releasing said engaging means to permit separation of said objects; and means for producing a positive separation force on said elongated member after release of said engaging means;

said elongated member comprising a ring supported by said one object and movable over said other object into line contact therewith by said engaging means.

2. A docking mechanism as defined in claim 1 wherein said engaging means comprises a plurality of arm mechanisms spaced around said other object in position for movement by said ring as said objects approach one another; said force producing means being operative upon said arm mechanisms to separate said ring from said other object.

3. A docking mechanism as defined in claim 2 having:

a sleeve projecting from said one object coaxially with said ring;

a cone section on said other object mounting said arm mechanisms; and a nose on said cone sertion insertable into said sleeve while said objects are held together, the nose section being removable to provide a passage between the two objects.

4. A docking mechanism for connecting and disconnecting objects comprising:

a passive structure including an elongated member supported at a distance from one object;

an active structure carrier by the other object;

said active structure comprising arm means mounted on said other object by a pivot pin and extending outwardly from said pivot pin for movement by said elongated member upon engagement therewith;

attachment means movably on said arm means and released by movement of said arm means by said elongated member for outboard movement into locking engagement with said elongated member; and actuator means for pulling said arm means about said pivot pin and for moving said elongated member into locked position with respect to said other object.

5. A docking mechanism as defined in claim 4 including:

means for locking said arm means to hold said elongated member in locked position;

means for selectively releasing said locking means;

means for moving said attachment means inboard along said arm means immediately upon release of said locking means in order to release said elongated member, and means for returning said arm means to the initial outwardly extending position upon release of said locking means thereby positively separating said objects.

6. A docking mechanism as defined in claim 5 having control means for energizing said actuator means only until said elongated member is moved into locked position and for energizing said releasing means only until said arm means are released from locked position.

7. A docking mechanism as defined in claim 4 including:

shock absorber means for dissipating the initial impact between said elongated member and said arm means and for straightening up said arm means after said impact; and spring means for continually biasing said attachment means toward the outboard end of said arm means for bringing said objects into proper alignment prior to actuation of said actuator means.

8. A docking mechanism as defined in claim 4 wherein said elongated member comprises a ring supported by said one object.

9. A docking mechanism for connecting and disconnecting objects comprising:

a passive structure including an elongated member supported at a distance from one object;

an active structure carried by the other object;

said active structure comprising arm means mounted to said other object at the inboard end by a pivot pin and extending outwardly from said pivot pin for movement by said elongated member upon engagement therewith;

hook means movably mounted on said arm means;

spring means for moving said hook means toward the outboard end of arm means;

latch means for normally holding said hook means adjacent said pivot pin and for releasing said hook means upon movement of said arm means by said elongated member to permit movement of said hook means by said spring means into engagement with said elongated member;

said hook means having means attaching to said elongated member upon initial engagement of said hook means with said member so that the force of said spring means on said hook means can align said objects; and actuator means for pulling said arm means about said pivot pin and moving said elongated member into locked position with respect to said other object.

10. A docking mechanism as defined in claim 9 including:

shock absorber means rigidly attached to said arm means for dissipating the energy developed between said elongated member and said arm means upon impact and for returning said arm means toward initial outwardly extending position while said spring means aligns said objects.

11. A docking mechanism as defined in claim 9 including:

hook carriage means movably mounted on said arm means and located inboard of said hook means;

second spring means for normally positioning said carriage means at the inboard end of said arm means;

said latch means normally locking said hook means to said carriage means and releasing said hook means from said carriage means upon movement of said arm means by said elongated member to permit said first spring means to move said hook means outboard into engagement with said elongated member.

12. A docking mechanism as defined in claim 11 having:

linkage means connecting said actuator means with said carriage means for moving said carriage means into locking engagement with said hook means after engagement of said hook means with said elongated member thereby also compressing said first spring means;

said actuator means moving said carriage means, said hook means, said arm means and said elongated member into locked position while compressing said second spring means.

13. A docking mechanism as defined in claim 12 having:

means for holding said linkage means and said elongated member in locked position; and means for selectively releasing said holding means for freeing said linkage means and permitting said second spring means to immediately move said carriage means and said hook means inboard of said arm means to free said elongated member.

14. A docking mechanism as defined in claim 13 including:

shock absorber means rigidly attached to said arm means for dissipating the impact force between said elongated member and said arm means and for returning said arm means toward initial outwardly extending position while said first spring means aligns said objects, said shock absorber means being compressed by movement of said arm means by said actuator means into locked position and returning said arm means to initial outwardly extending position upon release of said holding means and positively separating said elongated member from said arm means.

15. A docking mechanism as defined in claim 9 including:

means for holding said arm means and said elongated member in locked position after movement into locked position by said actuator means; and means for selectively releasing said holding means to permit separation of said elongated member from said arm means.

References Cited

UNITED STATES PATENTS

| | | | |
|---|---|---|---|
| 809,759 | 1/1906 | Toole et al. | 285—317 |
| 1,903,445 | 4/1933 | Ernst | 285—320 |
| 2,803,473 | 8/1957 | Hohmann | 244—135 |
| 2,942,816 | 6/1960 | Dostie | 244—135 |

FERGUS S. MIDDLETON, *Primary Examiner.*